United States Patent
Docherty et al.

(10) Patent No.: US 12,309,458 B2
(45) Date of Patent: May 20, 2025

(54) CONTENT RECOMMENDATION SYSTEM AND METHOD

(71) Applicant: ThinkAnalytics Ltd., Glasgow (GB)

(72) Inventors: Peter Docherty, Glasgow (GB); Shahad Ahmed, Glasgow (GB); Darren Callaghan, Glasgow (GB); Ewen Cattanach, Glasgow (GB); Gordon McIntyre, Glasgow (GB); Alan Ryman, Glasgow (GB); David Scott, Glasgow (GB); Asim Ullah, Glasgow (GB); Xiaowei Zhang, Glasgow (GB)

(73) Assignee: ThinkAnalytics Ltd., Glasgow (GB)

( * ) Notice: Subject to any disclaimer, the term of this patent is extended or adjusted under 35 U.S.C. 154(b) by 0 days.

(21) Appl. No.: 18/481,921

(22) Filed: Oct. 5, 2023

(65) Prior Publication Data

US 2024/0031652 A1    Jan. 25, 2024

Related U.S. Application Data

(63) Continuation of application No. 17/727,509, filed on Apr. 22, 2022, now Pat. No. 11,812,107, which is a
(Continued)

(30) Foreign Application Priority Data

May 25, 2018 (GB) ..................................... 1808669

(51) Int. Cl.
*H04N 21/466* (2011.01)
*H04N 21/25* (2011.01)
(Continued)

(52) U.S. Cl.
CPC ....... *H04N 21/4668* (2013.01); *H04N 21/251* (2013.01); *H04N 21/4335* (2013.01); *H04N 21/44224* (2020.08); *H04N 21/4756* (2013.01)

(58) Field of Classification Search
CPC ......... H04N 21/4668; H04N 21/44224; H04N 21/251; H04N 21/4335; H04N 21/4756
See application file for complete search history.

(56) References Cited

U.S. PATENT DOCUMENTS 7,805,129 B1    9/2010 Issa et al.
9,756,390 B1    9/2017 Docherty et al.
(Continued)

FOREIGN PATENT DOCUMENTS

EP    1317143    6/2003
EP    2207348    7/2020
(Continued)

OTHER PUBLICATIONS

UKIPO; Combined Search and Examination Report dated Nov. 12, 2018 in 1808669.4.
(Continued)

*Primary Examiner* — Nnenna N Ekpo
(74) *Attorney, Agent, or Firm* — SNELL & WILMER L.L.P.

(57) ABSTRACT

The method may include providing one or more content item recommendations, by opening a content recommendation session for a selected user, retrieving some user data for the selected user from a first storage resource, obtaining content information concerning content available from content sources, using the user data and the content information to generate a content item recommendation for the user and providing the content item recommendation to the user. The user data for the selected user may be stored at contiguous physical locations at the first storage resource.

8 Claims, 5 Drawing Sheets

Related U.S. Application Data continuation of application No. 16/421,851, filed on May 24, 2019, now Pat. No. 11,343,573.

(51) Int. Cl.
  *H04N 21/4335* (2011.01)
  *H04N 21/442* (2011.01)
  *H04N 21/475* (2011.01)

(56) References Cited

U.S. PATENT DOCUMENTS

| | | | |
|---|---|---|---|
| 9,973,797 | B1 | 5/2018 | Docherty et al. |
| 10,091,555 | B1 | 10/2018 | Docherty et al. |
| 10,289,739 | B1 | 5/2019 | Docherty et al. |
| 10,356,035 | B1 | 7/2019 | Gravino |
| 10,412,454 | B2 | 9/2019 | Docherty et al. |
| 2003/0106064 | A1 | 6/2003 | Plourde, Jr. |
| 2005/0204385 | A1* | 9/2005 | Sull ............ G11B 27/105 725/35 |
| 2007/0157222 | A1 | 7/2007 | Cordray |
| 2008/0304812 | A1 | 12/2008 | Jin |
| 2010/0005492 | A1 | 1/2010 | Takano |
| 2010/0070507 | A1 | 3/2010 | Mori |
| 2010/0329644 | A1* | 12/2010 | Rosenfeld ........ H04N 21/235 725/39 |
| 2011/0243529 | A1 | 10/2011 | Oryoji et al. |
| 2014/0149344 | A1 | 5/2014 | Pudipeddi et al. |
| 2014/0279756 | A1 | 9/2014 | Whitman |
| 2015/0082330 | A1 | 3/2015 | Yun |
| 2015/0100987 | A1 | 4/2015 | Whitman et al. |
| 2015/0269488 | A1 | 9/2015 | Galai |
| 2017/0311015 | A1 | 10/2017 | Docherty et al. |
| 2018/0321858 | A1 | 11/2018 | Hutchison |

FOREIGN PATENT DOCUMENTS

| | | |
|---|---|---|
| WO | 200115449 | 3/2001 |
| WO | 0227526 | 4/2002 |
| WO | 2008042242 | 4/2008 |
| WO | 2013130834 | 9/2013 |
| WO | 2013186061 | 12/2013 |

OTHER PUBLICATIONS

UKIPO; Combined Search and Examination Report dated Feb. 11, 2021 in GB Application No. 2019720.8.
UKIPO; Examination Report dated Dec. 30, 2021 in GB Application No. 2019720.8.
USPTO; Non-Final Office Action dated Aug. 6, 2020 in U.S. Appl. No. 16/421,851.
USPTO; Final Office Action dated Oct. 27, 2020 in U.S. Appl. No. 16/421,851.
USPTO; Advisory Action dated Dec. 22, 2020 in U.S. Appl. No. 16/421,851.
USPTO; Non-Final Office Action dated Apr. 9, 2021 in U.S. Appl. No. 16/421,851.
USPTO; Final Office Action dated Jun. 30, 2021 in U.S. Appl. No. 16/421,851.
USPTO; Advisory Action dated Sep. 15, 2021 in U.S. Appl. No. 16/421,851.
USPTO; Non-Final Office Action dated Oct. 5, 2021 in U.S. Appl. No. 16/421,851.
USPTO; Notice of Allowance dated Mar. 3, 2022 in U.S. Appl. No. 16/421,851.
UKIPO, United Kingdom Combined Search and Examination Report dated Aug. 9, 2022 in Application No. GB2208402.4.
UKIPO, United Kingdom Combined Search and Examination Report dated Aug. 9, 2022 in Application No. GB2208401.6.
USPTO; Non-Final Office Action dated Feb. 24, 2023 in U.S. Appl. No. 17/727,509.
USPTO; Final Office Action dated Jun. 16, 2023 in U.S. Appl. No. 17/727,509.
USPTO; Advisory Action dated Aug. 7, 2023 in U.S. Appl. No. 17/727,509.
USPTO; Notice of Allowance dated Aug. 25, 2023 in U.S. Appl. No. 17/727,509.
UKIPO; United Kingdom Abbreviated Examination Report dated Jan. 10, 2023 in Application No. GB2215796.0.
UKIPO; United Kingdom Combined Search and Examination Report dated Feb. 14, 2023 in Application No. GB2215796.0.

* cited by examiner

Table 1 – CRE learning tables

| Section Number | DB Table name |
|---|---|
| Subscriber Timeslot Learning tables | |
| 10.1 | re_sub_ts_learned_language |
| 10.4 | re_sub_ts_content_item_ratings |
| 10.5 | re_sub_ts_feature_ratings |
| 10.6 | re_sub_ts_watched_episodes |
| | |
| Customer Learning tables: | |
| 7.1 | re_customer_learned_language |
| 7.4 | re_content_item_ratings |
| 7.5 | re_feature_ratings |
| 7.6 | re_customer_watched_episodes |
| | |
| Session Learning tables | |
| 12.1 | re_session_learned_language |
| 12.4 | re_session_content_item_ratings |
| 12.5 | re_session_feature_ratings |
| 12.6 | re_session_watched_episodes |
| | |
| Cookie Learning tables | |
| 14.1 | re_cookie_learned_language |
| 14.4 | re_cookie_content_item_ratings |
| 14.5 | re_cookie_feature_ratings |
| 14.6 | re_cookie_watched_episodes |
| | |
| Subscriber Combined Learning tables | |
| 9.1 | re_sub_learned_language |
| 9.4 | re_sub_content_item_ratings |
| 9.5 | re_sub_feature_ratings |
| 9.6 | re_sub_watched_episodes |

Figure 5

CONTENT RECOMMENDATION SYSTEM AND METHOD

CROSS-REFERENCE TO RELATED APPLICATIONS

This application is a continuation of, claims priority to and the benefits of, U.S. Ser. No. 17/727,509 filed on Apr. 22, 2022, entitled "CONTENT RECOMMENDATION SYSTEM AND METHOD." The '509 application is a continuation of, claims priority to and the benefits of, U.S. Ser. No. 16/421,851 filed on May 24, 2019, now U.S. Pat. No. 11,343,573 issued May 24, 2022 and entitled "Content Recommendation System and Method." The '851 application claims priority to and the benefit of GB Application No. 1808669.4, filed on May 25, 2018. All of which are hereby incorporated by reference in their entirety for all purposes.

FIELD

The present invention relates to a content recommendation system and method.

BACKGROUND

Developments in technology, for example, the advent of digital television, internet enabled video-on-demand services and the availability of personal video recorders has led to consumers altering their viewing habits including how, where and when they consume video and other content. Furthermore, the amount of content that is available via many systems has expanded enormously.

In this context, during a viewing session, a viewer is faced with a very large choice of what to watch from a wide range of available content sources. Faced with such a large choice a viewer may view or otherwise consume content they are already familiar with rather than try something new.

The large choice of content and the increased variety of content sources has led to various technical developments to enable users to better access and select content, for example developments to electronic programme guides (EPGs). It is also known for viewers to filter the large choice of content using a search function. However, both approaches can result in viewers continuing to view content with which they are already familiar. Ultimately, this can lead viewers to become dissatisfied as they may feel they are not exploiting the system and range of content to the full. It can be frustrating and time consuming for a user to seek out suitable new content available from the wide range of choices available from TV and other content service providers. It has been suggested to provide viewers with content recommendations, which may lead them more rapidly to content that may be of interest.

Personal video recorders have the capability of recording and storing content items from live linear television broadcasts and downloading and storing content items from video on demand services. As such, the content items stored on such devices provide a content source that is unique to the owner of the personal video recorder.

SUMMARY

In a first aspect of the invention, there is provided a method for providing one or more content item recommendations for a user of a content distribution system having a plurality of users, comprising: opening a content recommendation session for a selected user; retrieving user data for the selected user from a first storage resource, storing the user data in a second storage resource, and maintaining the user data in the second storage resource during the content recommendation session for the selected user; using the user data from the second storage resource and content information concerning content available from one or more content sources to generate at least one content item recommendation for the selected user during the content recommendation session for the selected user; and providing the at least one content item recommendation, wherein the method further comprises maintaining content recommendation sessions for a plurality of the users and maintaining in the second storage resource user data for said plurality of the users substantially simultaneously.

The providing of the at least one content item recommendation may comprise providing the at least one content item recommendation to a user device associated with the selected user, either directly or indirectly. The at least one content item recommendation may be provided to a further device, database and/or system that may process and/or send the at least one content item recommendation to the user device.

The first storage resource may comprise at least one of a remote storage resource and a less rapidly readable storage resource, and/or the second storage resource may comprise at least one of a local storage resource and a more rapidly readable storage resource.

The first storage resource may comprise a hard disk storage resource and the second storage resource may comprise random access memory (RAM).

The user data may be stored in the first storage resource at substantially contiguous physical storage locations.

In a further aspect of the invention, which may be provided independently there is provided a method for providing one or more content item recommendations, comprising: opening a content recommendation session for a selected user; retrieving at least some user data for the selected user from a first storage resource; obtaining content information concerning content available from one or more content sources; using the user data and the content information to generate at least one content item recommendation for the user; and providing the content item recommendation to the user, wherein the user data for the selected user is stored at substantially contiguous physical locations at the first storage resource.

The method may comprise providing the one or more content item recommendations to a user of a distribution system having a plurality of users.

Storing the user data for the selected user at substantially contiguous physical locations may comprise storing the user data in a single sector of the first storage resource, or in a plurality of substantially contiguous sectors of the first storage resource.

The method may further comprise updating the user data of the selected user in at least the second storage resource based on one more user actions of the selected user during the content recommendation session. The method may comprise using the updated user data stored in the second storage resource in generating at least one subsequent content item recommendation during the content recommendation session for the selected user.

The method may comprise monitoring for actions of the selected user during the content recommendation session.

The actions may comprise actions performed by the user device, for example in response to user instructions.

The method may further comprise updating the user data for the selected user in the first storage resource.

Thus, the user data may be maintained in parallel in both the first and second storage resources, for example both in a hard disk resource in RAM.

The updating of the user data in the second storage resource may be performed in response to each new relevant user action, and the updating of the user data in the first storage resource may be performed at least one of:

a) in response to an expiry of the content recommendation session;
b) periodically;
c) in response to at least one of processing capacity or communication capacity being available.

The updating of the user data in the first storage resource may comprise copying of at least some of the data from the second storage resource to the first storage resource.

The updating of the user data in the first storage resource and the updating of the user data in the second storage resource may be both performed in response to each new relevant user action.

The updating of the user data for the selected user in the first storage resource may comprise storing the updated user data for the selected user at substantially contiguous physical locations at the first storage resource.

The updated user data for the selected user may comprise new user data and pre-existing user data, and the storing of the updated user data for the selected user may comprise storing the new user data in the first storage resource at physical locations substantially contiguous with physical locations at which the pre-existing user data for the selected user are stored.

The pre-existing user data for the selected user may comprise user data for the selected user that was already stored in the first storage resource at the start of the content recommendation session for the selected user.

The method may comprise deleting the user data of the selected user from the second storage resource in response to at least one of: expiry of the content recommendation session for the selected user; the second storage resource being full or exceeding a threshold storage limit.

The user data may comprise user preference data based at least in part on user activity and/or at least one user preference selection by the user.

The user data may comprise at least one of: user action data representing previous user actions, optionally content selection, viewing or recording actions, user language data and/or episode data; content metadata representing properties of content viewed, recorded or selected by a user.

The at least one content recommendation may be for display via a content selection and/or recommendation output (for example a screen or window), and the method may comprise displaying an alternative or modified content selection and/or recommendation output in response to at least one of:

the at least one content recommendation not being received within a predetermined time period or by a threshold time;
the content selection output being ready for display before the at least one content recommendation is received and/or processed.

In a further aspect, which may be provided independently, there is provided a method comprising: modifying a process for displaying at least one content recommendation via a content selection and/or recommendation output, wherein the modifying comprises displaying an alternative or modified content selection and/or recommendation output in response to at least one of: the at least one content recommendation not being received within a predetermined time period or by a threshold time; the content selection output being ready for display before the at least one content recommendation is received and/or processed.

The method may further comprise providing the at least one content item recommendation to the user device associated with the selected user only if the content item recommendation is generated or provided within a predetermined time period.

The content item recommendation may be provided to the user device via a further server or device, for example a server or device of a TV operator or other content provider. It may be the further server or device that determines whether the content item has been generated or provided within the predetermined time period. For example the further server or device may provide to the user device a default or alternative content item recommendation, or no content item recommendation, if it has not received the content item recommendation within the predetermined time period.

The predetermined time period may be less than or equal to 30 s, optionally less than or equal to 10 s, optionally less than or equal to 1 s. The predetermined time period may be between 1 s and 30 s, optionally between 1 s and 10 s, optionally between 1 s and 5 s.

The system may comprise at least one of a TV distribution system, a TV subscription service, a video-streaming system, a Video-on-Demand system.

The one or more content recommendations may be for providing to a user device, and the user device may comprise at least one of a set top box, a television, a mobile device, a smartphone, a computer, a game console or other device, a tablet.

The method may further comprise storing the one or more content recommendations in a database and/or outputting the one or more content recommendations via at least one of: a batch process, at least one e-mail, at least one short message service (SMS) message.

The system may comprise at least 10,000 user devices, optionally at least 100,000 user devices, optionally at least 1,000,000 user devices.

In a further aspect of the invention, which may be provided independently, there is provided a method of collating content information concerning content stored on a plurality of data stores of a content distribution system, the method comprising: receiving a record action message corresponding to a recording of a content item on a data store of the plurality of data stores; examining in response to receiving the record action message a collated content information source to determine whether it includes stored content item information corresponding to the content item; dependent on whether the collated content information source includes content item information corresponding to the content item, obtaining content information corresponding to the content item from a further content information source; and storing the obtained content information in the collated content information source.

The plurality of data stores may comprise at least one of:
a) a plurality of storage devices, optionally local storage devices and/or storage devices remote from one another;
b) a plurality of storage areas in a networked and/or virtual storage system, optionally a cloud storage system.

The collated content information source may form part of, or be associated with, a central server and/or a content recommendation processing resource.

The method may comprise making the obtained content information in the collated content information source available to a content recommendation processing resource for use in a content recommendation process The plurality storage devices and/or the plurality of storage areas may comprise a plurality of personal video recorders (PVRs), optionally a plurality of cloud-based PVRs.

The method may further comprise storing the obtained content information in the collated content information source in response to the obtained content information not already being stored in the collated content information source and/or in dependence on data representative of a recording date and/or time.

The method may comprise receiving respective record action messages in respect of each of a plurality of the data stores, storage devices and/or storage areas and examining the collated content information source in response to receipt of each record action message, such that the collated content information source collates content information concerning content items stored on at least one of the plurality of data stores, storage devices and/or storage areas.

In another aspect of the invention, which may be provided independently, there is provided a method for providing one or more content item recommendations to a user of a content distribution system, the content distribution system comprising a plurality of content sources, wherein the plurality of content sources comprises at least one data store associated with the user, the method comprising: receiving a request to recommend content to the user; using content information concerning the at least one content item stored on the at least one data store to generate a content item recommendation for the user; and providing the content item recommendation to the user.

The data store associated with the user may comprise a data store for storing content associated with only said user or a group of associated users.

Reference to a user may include reference to a subscriber. A subscriber may have a plurality of users associated with it. For example, a subscription may be associated with a household and there may be a plurality of users, for example family members, associated with the subscription and who may, for example, store content in the data store.

The method may comprise obtaining the content information concerning the at least one content item stored on the at least one data store of the user from a collated content information source that collates content information concerning content stored on respective data stores of a plurality of users.

The or each data store may comprise a device local to the user or the user's premises and/or may comprise a cloud-based or other remote storage device or a user-specific area on a cloud-based or other remote storage system.

The collated content information source may be obtained or maintained using any suitable method as described herein.

The content recommendation may comprise a recommendation of at least one content item stored on the at least one data store of the user.

The determining of at least one content item stored on the data store of the user may comprise sending an enquiry from a content recommendation processing resource remote from the data store and receiving a response identifying the at least one content item stored on the data store of the user.

The at least one data store may comprise at least one storage device, optionally at least one local storage device, and/or the at least one data store may comprise at least one storage area in a networked and/or virtual storage system, optionally a cloud storage system.

The at least one storage device may comprise at least one personal video recorder (PVR), optionally at least one cloud-based PVR.

In a further aspect of the invention, which may be provided independently, there is provided a method for providing one or more content item recommendations to a user of a content distribution system comprising a plurality of sources of content of different types and having a plurality of users, the method comprising: retrieving user data for a selected user wherein the user data represents at least one user action or preference in relation to content of a first of the plurality of different types; and using the user data and content information concerning available content to generate a recommendation of at least one content item of a second type of the plurality of types; and providing the recommendation to a user device associated with the selected user.

The different types of content may comprise at least some of video content, audio content, computer games, printed content, or live performances, optionally at least some of movies, TV programmes music, podcasts, talking books, computer games, books, magazines, concerts, plays, comedy performances or sporting events.

In a further aspect, which may be provided independently, there is provided a system for providing one or more content item recommendations for a user of a content distribution system having a plurality of users, comprising a processing resource configured to:

open a content recommendation session for a selected user;

retrieve user data for the selected user from a first storage resource, store the user data in a second storage resource, and maintain the user data in the second storage re source during the content recommendation session for the selected user;

use the user data from the second storage resource and content information concerning content available from one or more content sources to generate at least one content item recommendation for the selected user during the content recommendation session for the selected user; and provide the at least one content item recommendation, wherein the processing resource is further configured to maintain content recommendation sessions for a plurality of the users and maintain in the second storage resource user data for said plurality of the users, substantially simultaneously.

In a further aspect, which may be provided independently, there is provided a system for providing one or more content item recommendations, comprising a processing resource configured to:

open a content recommendation session for a selected user;

retrieve at least some user data for the selected user from a first storage resource;

obtain content information concerning content available from one or more content sources;

use the user data and the content information to generate at least one content item recommendation for the user; and provide the content item recommendation to the user, wherein the user data for the selected user is stored at substantially contiguous physical locations at the first storage resource.

In a further aspect, which may be provided independently, there is provided a system, comprising a processing resource configured to:
modify a process for displaying at least one content recommendation via a content selection and/or recommendation output, wherein the modifying comprises displaying an alternative or modified content selection and/or recommendation output in response to at least one of:
the at least one content recommendation not being received within a predetermined time period or by a threshold time;
the content selection output being ready for display before the at least one content recommendation is received and/or processed.

In a further aspect, which may be provided independently, there is provided a system of collating content information concerning content stored on a plurality of data stores of a content distribution system, the system comprising a processing resource configured to:
receive a record action message corresponding to a recording of a content item on a data store of the plurality of data stores;
examine in response to receiving the record action message a collated content information source to determine whether it includes stored content item information corresponding to the content item;
dependent on whether the collated content information source includes content item information corresponding to the content item, obtain content information corresponding to the content item from a further content information source; and
store the obtained content information in the collated content information source.

In a further aspect, which may be provided independently, there is provided a recommendation system for providing one or more content item recommendations to a user of a content distribution system, the content distribution system comprising a plurality of content sources, wherein the plurality of content sources comprises at least one storage device associated with the user, the recommendation system comprising a processing resource configured to:
receive a request to recommend content to the user;
determine at least one content item stored on the at least one storage device of the user;
use content information concerning the at least one content item stored on the at least one storage device to generate a content item recommendation for the user; and
provide the content item recommendation to the user.

In a further aspect, which may be provided independently, there is provided a method for providing one or more content item recommendations to a user of a content distribution system comprising a plurality of sources of content of different types and having a plurality of users, the method comprising:
retrieving user data for a selected user wherein the user data represents at least one user action or preference in relation to content of a first of the plurality of different types; and
using the user data and content information concerning available content to generate a recommendation of at least one content item of a second type of the plurality of types; and
providing the recommendation to a device associated with the selected user.

In a further aspect, which may be provided independently, there is provided a computer program product comprising computer-readable instructions that are executable to perform a method according to any clauses or claims herein.

Features in one aspect may be provided as features in another aspect. For example, method features may be provided as apparatus features and vice versa.

BRIEF DESCRIPTION OF THE DRAWINGS

Various aspects of the invention will now be described by way of example only, and with reference to the accompanying drawings, of which:

FIG. 5 is a representation of information stored on a hard disk storage resource.

DETAILED DESCRIPTION

In TV systems, or other systems for provision of content to a user, each service provider may have thousand, tens or hundreds of thousands, or millions of customers, wherein each customer is unique and may have different viewing habits and preferences. It has been recognised pursuant to the present invention that each may require different content recommendations. Tracking, recording and processing large volumes of customer data together with large amounts of content data in order to provide a personalised recommendation within the time constraints demanded by a viewer and by the system poses a significant technical challenge. The time constraints demanded by particular content providers, or expected by users, for provision of recommendations may be particularly demanding, with content recommendations being required to be generated almost instantaneously, for example within a few hundred milliseconds of a user switching on a set top box or otherwise beginning a viewing session. This can present a significant technical challenge, particularly as the content recommendation system is usually hosted on a server remote from the set top box and, for systems with millions of subscribers, may have to deal simultaneously with hundreds of thousands of content recommendation demands per minute during busy periods.

Figure 1:
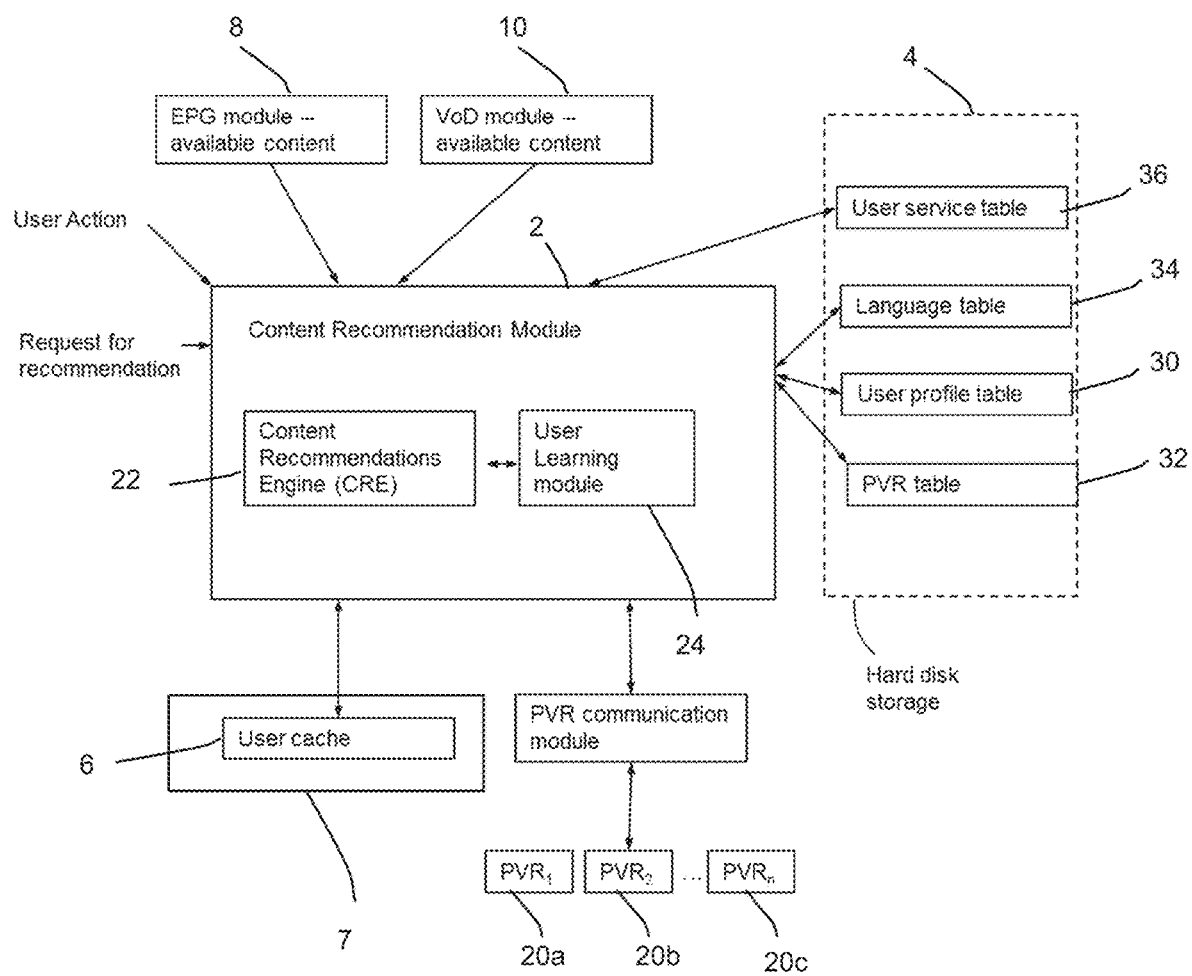
FIG. 1 is a schematic diagram of a digital content recommendation system.

FIG. 1 shows a schematic diagram of a digital content recommendation system according to an embodiment. The system is able to provide content recommendations in real time or near real time for many thousands, tens of thousands or even hundreds of thousands or more users. Example modes of operation are described below in relation to PVRs associated with users, but content recommendations may be provided to or in respect of any suitable users or user accounts, with recommended content being provided or accessible via any suitable devices, for example set-top boxes, smartphones, PCs or tablets or any other suitable content delivery mechanism, The system comprises a content recommendation module 2 linked to a first storage resource in the form of a hard disk storage device 4, which is used to store various user data.

The content recommendation module 2 is also communicatively linked to a second storage resource in the form of a local storage device that includes at least one cache, for example a user cache 6. In the embodiment of FIG. 1 the local storage device is in the form of RAM 7 but any suitable storage device may be used in alternative embodiments. The user cache 6 may be used for temporary storage of user data obtained from the hard disk storage device 4 during a content recommendation session, as discussed in more detail below.

As discussed further below, the content recommendation module is able to communicate, either directly or indirectly, and either via wired or wireless connection, with very large numbers of users or user devices and to provide recommendations for or derived from such users or user devices. Other than some PVRs which are shown schematically in FIG. 1, user devices are not shown in FIG. 1 for clarity.

The content recommendation module 2 is also linked to sources of information concerning available content, in this case an EPG module 8 and a Video-on-Demand (VoD) module which provide information concerning content available to a user via an EPG (for example, scheduled TV programmes on a set of channels) and via a VoD service. In alternative embodiments, a variety of other sources of content may be available as well as, or in addition to, EPG and VoD content, for example internet content and/or any suitable streamed content via wired or wireless connection.

In the embodiment of FIG. 1, the EPG module 8, the VoD module 10, Content Recommendation Module 2, the User Cache 6, the PVR Communication module 12, the EPG module 8 and the User Learning module 24 are implemented in a server. The server includes communication circuitry that enables communication between the server, or appropriate components of the server with each of the user devices, and with the content sources, for example a TV service operator or other content service operator.

Any other suitable implementation of the EPG module 8, the VoD module 10, content recommendation module 2, the user cache 6, the PVR communication module 12, the EPG module 8 and the user learning module 24 may be provided in alternative embodiments, for example they may be implemented in any software, hardware or any suitable combination or software and hardware. Furthermore, in alternative embodiments any one of the components as described in relation to the embodiment of FIG. 1 or other embodiments may be combined with any other one(s) of the components, or any one of the components may be split into multiple components providing the same or similar functionality.

The EPG module 8 and the VoD module 10 obtain information concerning available content from the content sources, for example a TV service operator or other content service operator. The content information comprises metadata of content, for example, television programme metadata. The metadata may be representative of a variety of different content parameters or properties, for example but not limited to programme title, time, duration, content type, programme categorisation, actor names, genre, release date, episode number, series number. It is a feature of the embodiment that the metadata stored at the EPG module 8 and the VoD module 10 may also be enriched with additional metadata, for example by the operator of the content recommendation system, such that additional metadata to that provided by the content sources or other external sources may be stored.

In the embodiment of FIG. 1 the content recommendation server, in particular the content recommendation module 2, communicates directly with each of the user devices, for example to receive user action data, to determine when a content recommendation is required for a particular user, and to supply content recommendations to the user devices. In alternative embodiments, the content recommendation module 2 communicates with the user devices via the content sources or via other servers or devices. For example, in such alternative embodiments, the user action data may be sent to the content recommendation server via one of the content source servers or other server or device, and the content recommendations may be sent to the user devices from the content recommendation module 2 via the content source servers or other server or device.

In the embodiment of FIG. 1 the system operates together with three sources of content for a user device: real-time linear television, for example terrestrial or satellite broadcast television; one or more video-on-demand (VoD) services, and pre-recorded video content stored on one or more personal video recorders (PVR). In alternative embodiments further sources of content as well as or instead of those shown may be used.

The operation of the digital content recommendation system is controlled by the content recommendation module 2. As can be seen in FIG. 1, the content recommendation module 2 is configured to communicate with the one or more content information modules: the electronic programme guide (EPG) module and VoD module 10. The content recommendation module 2 is also configured to communicate with the user cache 6 local to the content recommendation module 2, the hard disk storage resource 4 and the one or more PVRs. A data access layer provides a communication interface between the content recommendation module 2 and the hard disk storage resource 4. A personal video recorder (PVR) communication module 12 provides a communication interface between the one or more PVRs 20*a*, 20*b*, . . . 20*z* and the content recommendation module 2.

The content recommendation module 2 has a content recommendation engine (CRE) 22 and a user learning module 24. The CRE 22 applies a set of processes to determine, in real time, content recommendations for a user based on user data and available content. The user learning module 24 receives data indicative of selections or other actions by a user and builds up a set of user data, for example comprising or representing a user history or profile, which is stored in the hard disk storage 4, and which is used in generating personalised recommendations for the user. Operation of the CRE 22 and the user learning module 24 is discussed in more detail below.

FIG. 1 shows a request for recommendation for the user being received by the content recommendation module 2. FIG. 1 also shows a user action being received by the content recommendation module 2. In addition to receiving requests for recommendation, the content recommendation module 2 is configured to log user activity. By logging user activity and storing activity over an extended period of time, the content recommendation module 2 and the hard disk storage 4 can build up an overall picture of the viewing activities, habits and preferences of a plurality of users. User actions are turned into learn actions by the user learning module 24 to be processed by the content recommendation engine 22.

The system of FIG. 1 is configured to operate with a plurality of user devices each associated with at least one user. The plurality of user devices may comprise a large number of devices, for example thousands, tens or hundreds of thousands, or even millions of devices. Each user device may be any device or combination of devices that is configured to enable a user to view or otherwise consume content. For example, each user device may be an internet-enabled device and/or a device for providing video or other content on demand and/or a device capable of receiving a real-time linear television broadcast signal. The user device may be a mobile device, for example a tablet, a smart phone or a laptop. Alternatively, the user device may not be mobile, for example, an internet browser enabled computing device, a smart television or a set-top box. The user device may also have an in-built or associated PVR for recording and storing content in some embodiments.

The user may be a viewer of the user device. Alternatively or additionally, the user may be a subscriber and/or customer of a service accessible through the user device.

The user device is communicatively coupled to the content recommendations module. The CRE 22 of the content recommendation module 2 has an application programming interface (the recommendation engine API) that provides a set of rules for search and recommendation requests to be communicated between the user device and the CRE 22. The user device is configured to send a recommendation request, directly or indirectly, to the CRE 22.

The user cache 6 is coupled to the content recommendations engine 22 and is configured to store data for the content recommendations engine 22. The content recommendation module 2 can access data stored on the user cache 6. The user cache 6 may be provided in random access memory (RAM) 7.

The hard disk storage 4 is communicatively coupled to the content recommendation module 2. The hard disk storage 4 stores data for use by the content recommendation module 2. The hard disk storage 4 is configured to store one or more databases. Entries from the databases on the hard disk storage resource 4 can be retrieved by the content recommendations module via requests made through the data access layer. Entries in the databases may also be updated via the data access layer.

The database(s) at the hard disk storage 4 store user data that is used by the CRE 22 to generate content recommendations. In the embodiment of FIG. 1 a set of database tables is provided that store information concerning the users.

In the embodiment of FIG. 1, the tables may include at least one user service table 36 that represent user service requirements, and at least one user profile table 30 that includes user attribute data that may be considered to represent a user profile. A user profile may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user and the gender of the user.

In the embodiment of FIG. 1, the tables may include various user learning tables that include data representing for example the viewing activities, habits and preferences of each user. The user data can include data representing for examples explicit ratings given by a user to a particular programme or other item of content. It is a feature of the embodiment of FIG. 1 that the user data also includes data representing actions, for instance viewing actions, taken by a user.

For example, if a user selects a programme or other item of content and views or otherwise consumes it for greater than a threshold period of time then a learn action is generated and at least one user data item for that user is stored in at least one of the tables. The data item may include various data including for example start and stop viewing time, time slot identifier, programme identifier, at least some metadata concerning the programme (although such metadata may be stored separately as content data rather than user data in some embodiments, and linked to or otherwise accessed if required, for example by the programme name or other identifier). The user learning module 24 determines whether user data should be stored in the tables in respect of a particular user action or set of actions. For example, if a user only views a programme for a very short period of time, for instance if they are channel surfing, then user data is not stored in the user learning tables in respect of that action. User data can be stored in respect of a variety of different user actions or events, for example selecting, viewing, recording or searching for content.

In the embodiment of FIG. 1 it can be understood that a large part of the user data comprises user history or user action data that represent user actions over a significant period of time. The CRE 22 can use such user data in real time during a content recommendation process to determine content recommendations.

In various embodiments, there is a limit to how long user data is kept or used. For example in the embodiment of FIG. 1 after a threshold period, for example six months after being collected, items of user data are deleted. Thus, in some embodiments the user data for a particular user may include only relatively recent user action data, although the amounts of data may still be substantial.

In the embodiment of a FIG. 1, a distinction is made between different types of user and different sets of the tables are stored for the different types of users.

FIG. 5 is a representation of certain database learning tables stored on the hard disk storage resource 4 of the embodiment of FIG. 1. The content recommendations engine 22 supports different categories of user. The tables of FIG. 5 correspond to different categories of user. The categories in this embodiment are: customer, subscriber and anonymous. Subscriber can, for example, refer to combined subscriber mode or time-slot subscriber mode. Anonymous can, for example, refer to cookie and/or session modes.

A customer may be a user who uses a service or content source. A customer profile may store one or more of the following attributes in some embodiments: preferred features; indication of preferred viewing times e.g. day, start and end times. The customer profile table also stores a list of the favourite content item group information: content source (e.g. EPG or VOD) and unique identifiers for content item groups.

A subscriber may be a person who has subscribed to a particular service rather than the individual user who is using the service. For example, the subscriber can be an account holder or an entity that represents a household. Individual users may be associated with a subscriber. There are at least two modes of operation of subscriber profiles. The first is combined mode, where data for the subscriber (for example attributes and/or subscriber actions) are used to generate content recommendations. In that case, the content recommendations may be based on attributes and/or user actions for a plurality of users associated with the same subscription, for example different members of the same household. The second is time-slot mode where content recommendations are generated in dependence on the particular time slot in question. For example user data generated for a particular time slot may be used selectively in generating content recommendations for a particular time slot (potentially with user date generated for other times slots being ignored or weighted to be of less significance) and/or with different rules and/or attributes being used for different time slots. For instance, there may be a rule that no adult content be recommended for morning or afternoon time slots, only for late evening or night-time time slots. Similarly, greater weighting may be given to children's programmes for certain time slots, for instance late afternoon time slots, making recommendations of children's programmes more likely during those time slots.

Anonymous profiles are used to recommend content when neither the individual customer or subscriber to a service is known. For example, for a web user who has not logged in is an anonymous user. There are two modes of operation of anonymous profiles. These are session mode (either single-session or multi-session mode) and cookie mode.

In single-session mode preferences of the anonymous consumer are stored in memory for the duration of a single session and then removed from memory at the end. In multi-session mode preferences of the anonymous consumer are kept in memory over more than one session. The anonymous profile is identified over more than one session using a unique session id stored in the anonymous profile.

In cookie mode, the recommendations engine 22 can perform anonymous session tracking using cookies, wherein on a first request a cookie containing the unique identification is added and in later sessions used to identify the anonymous user. This works in a web environment. A cookie session profile holds a list of cookies that are known to the system together with data referring to when the cookie was created or last accessed by the content recommendations engine 22.

For each user of all categories, the content recommendations engine 22 has separate groups of learning tables. In FIG. 5, the learning tables shown are "learned language", "exclude content group", "content item ratings", "feature ratings" and "watched episodes". These tables are shown by way of example. Other tables may also be stored in the embodiment of FIG. 1. Each user may have explicit preferences and implicit preferences. Explicit preferences are information the consumer tells the system by, for example, by entering a questionnaire. Implicit preferences are information learned by the system through user actions. Data corresponding to user actions for the purpose of learning are stored in the learning tables.

The learned language table 32 stores data relating to audio languages of content items that have been user actioned by the user. For example, the feedback table can store learned language information, the date at which the language was learned and an indication of whether or not the entry has been aged out.

The exclude content group table stores data corresponding to content explicitly excluded by the user. For example, the feedback tables also contain information on content items and content item groups that have been manually excluded by the customer. For example, for individual content items that have been excluded this information includes: identifier of the content item; content source; data and time of exclusion; series title of content item; client type ID (e.g. web, call centre, set-top box). For content item groups, this information includes: customer identifier, time and date content item group excluded; content source; client type ID. In both case, a flag is included that indicated whether or not the exclusion has been aged out.

The content item ratings table stores data representing features of content such as the features, actors, channels. Feature ratings allows learn actions to specify features of content information instead of the content item. A customer is capable of applying ratings to a content item. Rating information is stored in the customer feedback table and includes: time and date rating given; customer identifier; activity identifier; name and identifier of content item rated; content item group identifier if content item associated with a content item group; rating value; a scaled rating value to be used by the recommendation engine 22; feature ratings; content source ID; client type ID; series title of content tem and content item instance identifier. A flag is also stored to indicate if the recommendation has aged out or not. A feature rating made by a customer can also be stored on a specific list of features and/or sub-genres.

The watched episodes table stores data corresponding to last actioned episode of a series actioned by a user. For example, for each customer the episode history for customers is stored. This includes a series identifier; a series title; a season and episode number, and the date and time the user action occurred.

In alternative embodiments, different data tables or combinations of data tables may be stored.

Description has been provided above concerning the structure of the system of FIG. 1. Operation of the system of FIG. 1 to provide a content recommendation to a user according to one mode of operation is now described with reference to the flowchart of FIG. 2. The system of FIG. 1 includes three sources of content for a user device: real-time linear television, for example terrestrial or satellite broadcast television; one or more VoD services, and pre-recorded videos stored on one or more PVRs. The process now described with reference to FIG. 2 uses two of the sources of content, the linear television and VoD sources. Use of the PVRs as a source of content is described below with reference to FIGS. 3 and 4.

Figure 2:
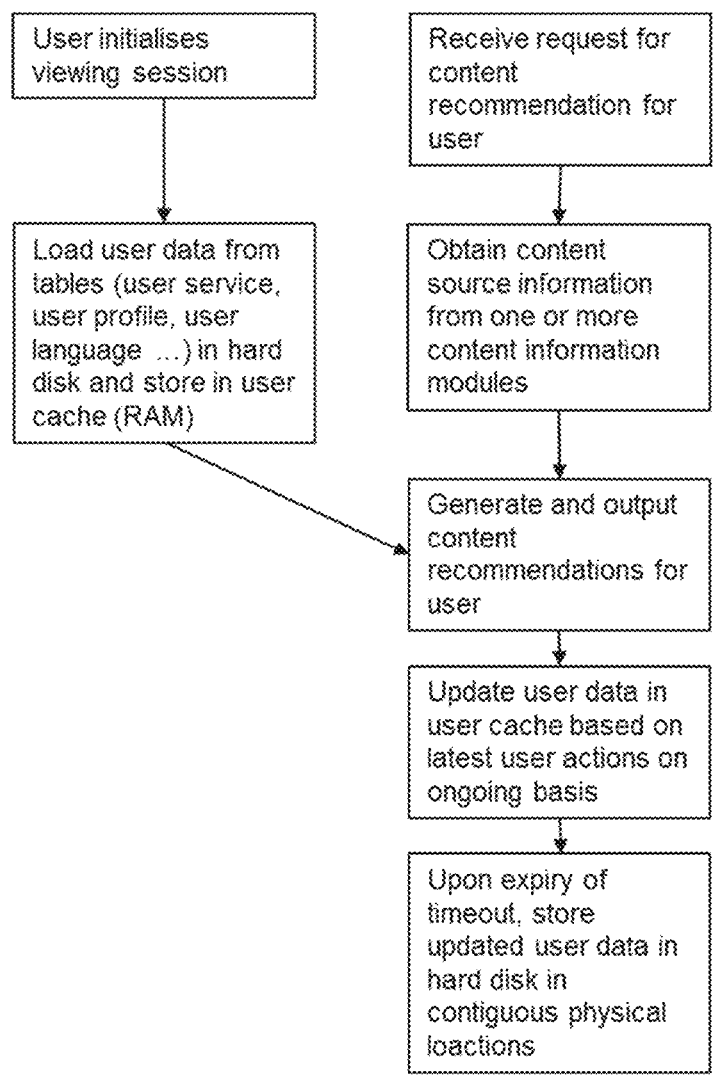
FIG. 2 is a flow chart of a method of recommending content.

As a first stage of the process of FIG. 2, a user initialises a viewing session through a first initiation event. An initiation event can, for example, be a user logging on to a service provider or turning on the user device. The initiation event is communicated to the content recommendation module 2 via a communication channel between the user device, for example a set top box or other device, for example at the user's home or other remote location, and the content recommendation module 2. In the embodiment of FIG. 1 there is direct communication between the user device and the content recommendation module 2. In alternative embodiments, communication between the user device and the content recommendation module 2 is mediated or passes through, for example a content provider, for instance a TV system operator to which the user subscribes.

In response to the initiation event, the user is then presented, via a display of the user device, with a content selection screen displayed on a display screen and/or user interface, which presents the user with a choice of viewing different content items from the content source. For an EPG content source, the content selection screen may form part of the EPG itself. For a VoD content source, a dedicated user interface may be presented. It is a feature of the embodiment of FIG. 1 that the choice of content items includes content recommendations generated by the content recommendation system of FIG. 1 and communicated to the user device. In one mode of operation it is a requirement that the content recommendations should be provided almost instantaneously, for example within a few hundred milliseconds, so that they can be included on the user interface together with other available items of content, for example live TV schedules, as soon as the user interface is displayed to the user.

Operation of the content recommendation system to provide the content recommendations according to the process of FIG. 2 is now described.

In the embodiment of FIG. 2, the initiation event is treated automatically by the content recommendations module as being a request for recommendations for the user.

In response to the initiation event a start time to the viewing session is logged by the CRE 22, for example, to coincide with the initiation event, a content recommendation session is opened and user data, associated with the user, are retrieved from storage on tables in the hard disk storage resource 4 and loaded to the user cache 6 in RAM 7. The user data are maintained in RAM 7 throughout the content recommendation session.

The CRE 22 also maintains content data in the RAM 7, for example any suitable data relating to properties of the content, such as metadata obtained from the EPG module 8 and the VoD module 10. The content data stored in RAM 7 may be updated periodically or in response to changes in the data stored, for example, at the EPG module 8 and VoD module 10. By caching the content data in RAM processing and data access speed may be increased.

Following retrieval of user data and obtaining content source information, the CRE 22 is configured to use the user data located in the user cache 6 together with the available content information to generate a personalised or other content item recommendation for the user. Any suitable content recommendation process may be used, for example based on a weighting, scoring and/or matching process generated based on previous user actions, and matching to available content. The content recommendation process may be at any desired level of simplicity, complexity or sophistication. In a simple example, if it is determined from the user data that a user has previously watched movies starring a particular actor, or watched football matches featuring a particular team, then the CRE 22 may produce a recommendation for the user to watch a movie or other content featuring that actor, or a programme concerning that football team, if such movie, programme or other content is currently available or will soon be available via the available content sources. It will be understood that the content recommendation process can be more sophisticated and, may be for example based on similarities or cross-correlations between different content parameters and user actions and properties based on large amounts of historical data. Any suitable content recommendation process may be used.

Once the CRE 22 has performed the content recommendation process, the content recommendation(s) generated by the CRE 22 are then transmitted to the user device either directly or indirectly. In some embodiments the content recommendation(s) are transmitted to a database, server or other device, for example a third party device. The content recommendation(s) may be further processed and/or may be transmitted onward to then user device either immediately, at a later time or upon request. The content recommendation(s) may be transmitted in any suitable fashion either to the user device, or to the database, server or other device.

In the present embodiment, software installed at the user device determines whether or how the content item recommendation are displayed on the user interface.

Subsequently, during the content recommendation session, a second or subsequent recommendation request may be generated in response to subsequent user activity. For example, this may occur when a user accesses the user interface, changes a channel or the user pauses playback of a previously selected content item. In general, the request for recommendation will generally coincide or anticipate a viewer accessing the user interface such that a recommendation can be posted to the user interface and presented to the user together with choice of other content items.

The request may be transmitted directly from the user device to the recommendation module. Alternatively, the request may be transmitted indirectly. For example, the user device may send a request to a separate server to be relayed to the content recommendation module 2. As another alternative, a server hosting the content that is being recommended may request the content recommendation for the user, and then the server may provide the recommendation to the user together with the choice of content items.

The request may be in the form of an indication that the user or user device has taken or requested a particular action, and the content recommendation module 2 may interpret this as a request to provide a content recommendation.

In response to the subsequent recommendation request the CRE 22 performs a further content recommendation process as outlined above to generate a personalised or other content item recommendation for the user.

Again, once the CRE 22 has performed the content recommendation process, the content recommendation(s) generated by the CRE 22 are then transmitted to the user device. The user device determines whether or how the content item recommendations are displayed on the user interface. For example the content item recommendations may be displayed on a new EPG screen corresponding to a selection made by the user, with the recommendation request having been generated by the selection made by the user.

As with the content recommendation made in response to the initiation of the user session, there may be significant constraints on how quickly the subsequent content recommendation should be provided. For example, there may be requirement that the content recommendation is provided within 200 ms or 300 ms, or within any other time period that would enable the content recommendation to be displayed simultaneously with, overlaid on or forming part of the new EPG screen when the new EPG screen is first displayed. In some embodiments the user device may be configured not to display the content recommendation if it is not received within a threshold time, for example within 30 s, 10 s, 5 s or 1 s by way of example, and for example to proceed with display of the EPG screen without the content recommendation. Any other suitable display output may be used as well as or instead of an EPG screen in alternative embodiments, for example a window or a selected portion of a screen or window.

It can be understood that the time constraints on providing content recommendations can be significant, given that personalised content recommendations may need to be generated on the fly, particularly as it may be necessary to provide personalised content recommendations for tens of thousands, hundreds of thousands, or even millions of users substantially simultaneously in the case of systems with large numbers of users and during busy periods such as peak viewing periods.

It will be understood that the CRE 22 may maintain content recommendation sessions for a plurality of the users and may maintain in the RAM user data for said plurality of the users substantially simultaneously. For example, user data may be maintained in the RAM 7 for thousands, hundreds of thousands or even millions of users substantially simultaneously, depending on the RAM storage capacity available and the number of subscribers or other users associated with the system.

It is a feature of the embodiment of FIG. 1 that at the start of a content recommendation session for a user the user data, including all of the various table entries, for the user, are read from the hard disk storage 4 and stored in the user cache 6 in RAM 7, or any other suitable local or rapidly readable storage resource in alternative embodiments. Throughout the content recommendation session the user data stored in the user cache 6 in RAM 7 is used by the CRE 22 to generate content recommendations for the user. This can provide a significant time saving compared to having to read the user data from the hard disk storage 4 each time a content recommendation is needed during the session. At the expiry of a session, the user data for the user is deleted from the cache. The expiry of the session may occur for example in response to no user actions have been received for a predetermined time period, in response to a user logging off a session or switching off a user device, or in response to loss of communication with the user device. If a new content recommendation session for the user subsequently begins, the user data is read again from the hard disk storage 4 and stored in the user cache 6 in RAM 7.

It is a further feature of the embodiment of FIG. 1 and at least some other embodiments that for each of the users, user data for the user is stored at substantially contiguous physical locations in the hard disk storage 4. For example, the user data for the user may be stored in a single sector of the hard disk storage 4, or in a plurality of substantially contiguous sectors of the hard disk storage 4. A copy or copies of some or all of the data may also be stored in other locations in some embodiments, for example for redundancy, back-up and/or ease of access.

It can be understood from the description above concerning user learn actions that in a system with a large number of users, user data may be generated almost continuously as users watch programmes and perform other actions. Such user data is stored in the hard disk storage 4, and in some embodiments the user data is distributed across physical storage locations in the hard disk storage 4 substantially without regard for, or independent of, the physical locations where other data for that user is stored. For example, the physical storage locations may be filled up in consecutive fashion as new user data is passed for storage, regardless of the user identity. Thus, contiguous physical storage locations in such embodiments may store user data obtained at the same or similar times, regardless of the identity of the user.

In contrast, in the embodiment of FIG. 1 particular set(s) of contiguous physical storage locations in the hard disk storage 4 are assigned to a particular user. For example each user may be assigned a particular sector or sectors of physical storage. User data for that user is then stored in the particular sector or sectors of physical storage assigned to that user. Thus, when user data is uploaded from the hard disk 4 to the user cache 6 at the start of a content recommendation session for a particular user, all of the user data can be read from the contiguous physical locations. In contrast, if the user data for the user were distributed over a range of different physical locations, then the read head or other physical reader device would have to move to each of those locations in turn in order to read all of the data.

It can be understood from the description of the nature of the user data, that for a particular user there may be large numbers of individual data items for each user, for example there may be individual data items for each individual relevant user action over the preceding 6 months or other predetermined or selected time period. For example each learn action (e.g. each time a user has watched or recorded a programme at any time during the previous six months or other relevant time period) will have its own data item (e.g. table entry) in the user data. Thus there may be several hundreds or even thousands of data items (e.g. table entries) that need to be read from the hard disk storage 4 at the start of a content recommendation session for a particular user. There can be a significant time saving in storing the data items for a particular user in contiguous physical locations in the hard disk storage 4, in contrast to storing them at a variety of locations (for example storing them in time-ordered or other fashion rather than user-ordered fashion in the physical storage). This can be particularly significant in a system with large numbers of users (for example, thousands, or tens or hundreds of thousands, or millions), particularly when the content recommendation process may be subject to significant time constraints (e.g. a requirement to provide content recommendations almost instantaneously, for example within 200 ms or 300 ms).

As noted above, maintaining user data for a user in RAM or other local or rapid access storage device during a content recommendation session can also provide time savings that are particularly significant in the context of a system having large numbers of users in which recommendations may need to be provided in real time or near-real time.

It is a feature of the embodiment of FIG. 1 and at least some other embodiments that during a content recommendation session for a particular user, the user data for that user may change or be added to. Thus content recommendations may need to be based on user data which is itself changing during the content recommendation session, which provides further technical considerations and challenges. For example during a content recommendation session, a user may carry out a number of user actions. These may include, for example, switching channel or selecting new content items, watching a content item, pausing a content item, logging in and out of the service, recording of a content item on a PVR or other recording device, or even selecting a piece of content based on a content recommendation provided earlier in the content recommendation session. User actions are logged by the content recommendation module 2 during the session. Some of these user actions are recorded as learn actions during the session. As discussed, the user learning module 24 has a set of rules for determining which user actions are learn actions.

A learn action may be based on an indication that a user has watched a content item for a specified period of time. The information may be used as an indication of user preferences and potentially to provide more accurate recommendations in the future. As discussed, a minimum event time filter may be implemented to ensure that short period events are not sent to the recommendation engine 22. In this case, a learn action is only generated if an event exceeds the minimum event time filter. In addition, there may be a rule that only one learn action for each content item should be generated. For example, a viewer may watch a programme and switch channels during an advert break and then return to the original programme. In such an event, only one learn action for the content recommendation engine 22 may be generated according to some embodiments.

New user data, for example new table entries, corresponding to the learn actions for the user ultimately are stored in the hard disk storage 4. However, it is a feature of the embodiment of FIG. 1 and of at least some other embodiments that user data for the user stored in RAM 7 during a content recommendation session for that user is updated, based on the learn actions for the user occurring during the content recommendation session, on an ongoing basis. Thus, the user data for a user stored in RAM 7 may change during a content recommendation session for the user, such that the content recommendations are based on the most up-to-date user data.

In the embodiment of FIG. 1, the user data for a user is overwritten by the user data stored in RAM 7 (which may be more up-to-date) in response to the end of a content recommendation session for the user. For example, the updated user data can be provided to the hard disk resource 4 in response to an expiry event. An expiry event may be a user action corresponding to a user terminating a session, terminating watching a content item (e.g. the end of a programme playback) or terminating recording of a content item. Alternatively an expiry event may occur a pre-determined period of time after a user action. For example, an expiry event may be a pre-determined period of time elapsing after a user action corresponding to a user commencing a viewing session.

In some embodiments, all of the user data for the user stored in the hard disk storage 4 may be overwritten by the user data stored in RAM 7. Alternatively, only changes to the user data may be written from RAM 7 to the hard disk storage 4. In some embodiments user data is written to the hard disk storage 4 periodically or in response to at least one of processing capacity or communication capacity being available. Higher priority may be given to updating the user data in RAM 7 than to updating the user data in the hard disk storage 4.

In some embodiments, the user data for a user may be maintained in RAM 7 after the end of a content recommendation session for the user and only deleted from RAM 7 in response to the user data from RAM 7 having been written to the hard disk storage 4.

In at least some other embodiments, each time new user data is generated (for example, when a learn action is generated during a content recommendation session for a user) it is written both to RAM and to the hard disk storage 4. Thus, an attempt may be made to maintain up-to-date user records for the user in parallel in both RAM and the hard disk storage 4. For example, one option is to provide the updated user data to the hard disk storage 4 at substantially the same time as updating the user data in the user cache 6. Alternatively, priority may be given to maintaining up-to-date user data in RAM 7, with the user data in the hard disk storage 4 only being updated on an as-and-when basis For example, priority may be given at the hard disk storage 4 to reading user data for other users in response to new content recommendation sessions for such users commencing, with the updating of user data in the hard disk storage 4 being given lower priority. This is consistent with the significant time constraints that may apply to providing content recommendations at the start of new content recommendation sessions.

The process described above with reference to FIG. 2 used only two of the sources of content, the linear television and VoD sources, by way of example. It has been recognised pursuant to the present invention that it may also be desirable to consider content available on a personal video recorder when making a recommendation to a viewer. However, in a system of millions of users there may be millions of separate personal video recorders, each of which may be considered to represent a separate content source, which presents considerable technical challenges in providing personalised content recommendations.

Furthermore, data concerning the content information stored on particular personal video recorders may be potentially incomplete, or out of date, particularly if the content was recorded a significant period of time previously (for example, months or even years). PVR data for a particular PVR may be maintained centrally based on user actions at the time of recording, but such data may be unreliable particularly if the PVR develops faults or is updated or if content is deleted from the PVR without the delete action being transmitted to or recorded by the content recommendation system.

The embodiment of FIG. 1 is a capable of providing content recommendations to a user that include recommendations of content stored on the user's PVR, for example in a variant of the process of FIG. 2. FIG. 1 shows a PVR communication module 12 that provides content information relating to recorded content items stored on one or more PVRs. Information associated with content provided by the three content sources is processed by the content recommendations engine 22.

Information relating to content available on a real-time linear television broadcast may also be received by the user device and is typically presented to a viewer via an electronic programme guide. The electronic programme guide is interactive. The information relating to the real-time linear television broadcast may be provided by either the service provider or by a third-party content information provider. The information may be delivered to the user device as part of the broadcast or may be provided through alternative means. For example, an internet enabled set-top box may receive a satellite broadcast carrying the content but receive information relating to the broadcast via an internet connection.

The user devices of the system of FIG. 1 comprise or have associated with them local storage devices in the form of PVRs, and each PVR may be considered to represent a content source. Each user may have a PVR for recording broadcasted content and/or for downloading and storing previously broadcast content. The PVR may be part of a user's set-top box or it may be a separate device. The recorded content is stored on a memory of the PVR to be viewed at a later time. FIG. 1 shows a set of n personal video recorders: $PV_1, PV_2, \ldots, PV_n$. Each PVR corresponds to a different user. Each PVR has a collection of content recordings stored on their respective memories. Typically each PVR will have a different selection of stored programmes from the other PVRs. However, more than one PVR may have one or more common programmes stored on their memories at a given time. For example, user of $PVR_1$ and user of $PVR_2$ may have recorded or downloaded the same content item or series of content items. Each PVR may have content items that are not available from other content sources, for example because they are not made available on VoD or have not been re-broadcast. This may also be a result of the age of the content item. For example, the content item may have been available for a certain amount of time from another content source but is no longer available.

In alternative embodiments the PVRs or other data stores for storing content for users may be implemented in forms other than local storage devices. For example, the data stores may be implemented as storage areas in a cloud storage system or other networked, remote, and/or virtual storage system.

The PVR communication module 12 of FIG. 1 is an interface between the PVRs 20a, 20b, . . . 20z and the content recommendation module 2. As described later, with reference to FIGS. 3 and 4, the content recommendation module 2 collects identifying information relating to the content items stored on the PVRs 20a, 20b, . . . 20z. Content items from the PVR of the user can then be taken into consideration in content recommendations. More information on the available content information of all the content sources is given with respect to FIG. 6.

Figure 3:
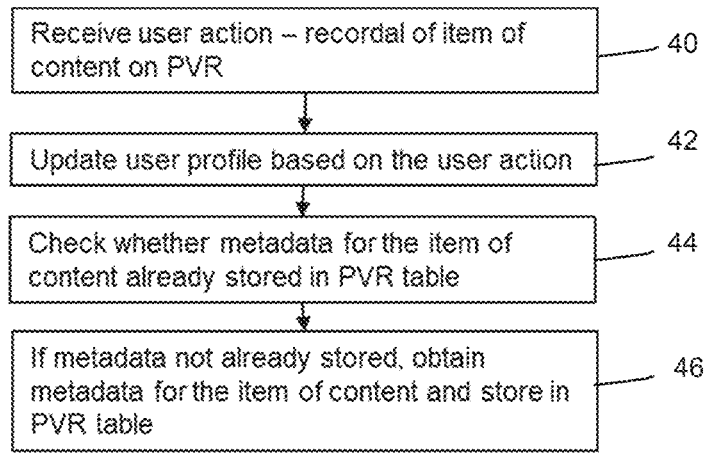
FIG. 3 is a flow chart of a method of collating personal video recorder content information.

FIG. 3 shows a flowchart outlining a mode of operation of the content recommendation system of FIG. 1. In particular, FIG. 3 is directed to compiling a content item information source for the PVRs 20a, 20b, ... 20z of FIG. 1. The content item information source is the form of PVR table 32 of the hard disk storage 4 in this embodiment. In alternative embodiments any other suitable collated content information source may be used as well as or instead of the PVR table 32. The PVR table 32 may be in any suitable form.

As a first step 40, the content recommendation module 2 receives a record action message corresponding to recording of a content item on a PVR 20a. The message may, for example, indicate the commencing of a recording of the content item or the successful completion of a recording of the content item. The message may originate from the user device, for example a set-top box associated with the PVR 20a. Alternatively or additionally in some embodiments may come from a further device or system. For example, in response to a user making a user selection the record action message may come from a web server or other device remote from the user that is able to receive notification of and/or monitor the user selection process.

Following the message being received, the user data is updated 42 in response to the message. The user profile is updated locally by the content recommendation module 2 in the user cache 6. This update may be simultaneously provided to the user profile stored in the hard drive storage resource or provided later as described earlier with reference to FIG. 2.

The message may contain content item identifiers relating to recorded content items. Identifying information may comprise any information that is useable to identify the content item. For example, this information may be title and/or episode number of the content item. Alternatively, the identifying information may not include any specific information and may be used to identify the content item in a later step. For example, the identifying information may be a broadcast time and channel of broadcast.

In response to receiving the message, the content recommendation module 2 examines the PVR information source stored on the hard drive storage resource. This step comprises checking 44 the stored PVR table 32 to determine whether or not content item information corresponding to an identifier of the recorded content is already stored in the PVR content recommendation information source. If content item information for the piece of content is already stored in the PVR table 32, this may indicate that the piece of content has already been recorded by at least one other PVR 20b, . . . 20z.

If the content item information is stored in the PVR table 32, then no further action is required at this time as the relevant content item information is already available to the content recommendation module 2.

If the content item information is not stored in the PVR table 32, then at stage 46 the relevant information is retrieved from a secondary content item information source. For example, the secondary content item information source may be one of the EPG or VoD sources of FIG. 1. A query is sent to one or more secondary content item information sources. The content item is identified using content item identifiers. The content item information is retrieved from the secondary content item information source based on comparison of these identifiers with the secondary content source information. The content item information is then retrieved and provided to the hard drive storage resource for storage in the PVR content item information source and/or made available to the content recommendation module 2.

By using the process of FIG. 3, it can be ensured for example that data corresponding to an item of content stored on a user's PVR 20a may need to be stored only once in the PVR table 32 at the hard disk 4 and/or in RAM, even if the item of content has been recorded separately by a large number of different PVRs 20a, 20b, . . . 20z, for example thousands, tens or hundreds of thousands, or even millions of PVRs.

In the embodiment of FIG. 1 and at least some other embodiments, the data stored in the PVR table 32 for a particular item of content includes metadata or other information concerning the item of content, for example substantially all metadata concerning the item of content stored by the EPG module 8 or VoD module 10. For example, the metadata stored in the PVR table 32 may be representative of a variety of different content parameters or properties, for example but not limited to programme title, time, duration, content type, programme categorisation, actor names, genre, release date, episode number, series number.

By storing the metadata or other content information in the PVR table 32 it can be ensured that information concerning items of content stored in at least one PVR may be available for the CRE 22 to use in performing a content recommendation process, even if the item of content had been recorded even months or years earlier. In alternative embodiments, if it is attempted to obtain the metadata or the content information concerning items of content stored in PVRs from the EPG module 8 or VoD module 10, it may be found that the metadata or other information is no longer available, which may make it difficult or impossible for the items of content stored in the PVR to be subject of a content recommendation by the CRE 22.

By providing a PVR table 32 that stores metadata or other information concerning items of content stored on at least one PVR substantially without duplication (for example, substantially the same amount of data is stored regardless of whether an item of content is stored on one, thousands or millions of PVRs) the amount of storage required, and data access times can be reduced. This can be particularly significant in systems such as that of FIG. 1 which may be required to provide real-time personalised content recommendations to thousands, tens or hundreds of thousands, or millions of users subject to strict time constraints.

In some alternative embodiments, metadata or other content information concerning content stored on a particular user's PVR 20a may be included the user data for that user instead of in a PVR table 32. However, that can potentially result in duplication of large amounts of data, as in some cases millions of users may be recording the same items of content, and can also result in an increase in the time required to read user data for the user from the hard disk storage 4. This can be significant when content recommendations must be provided within a threshold time period, for example 200 ms or 300 ms.

Figure 4:
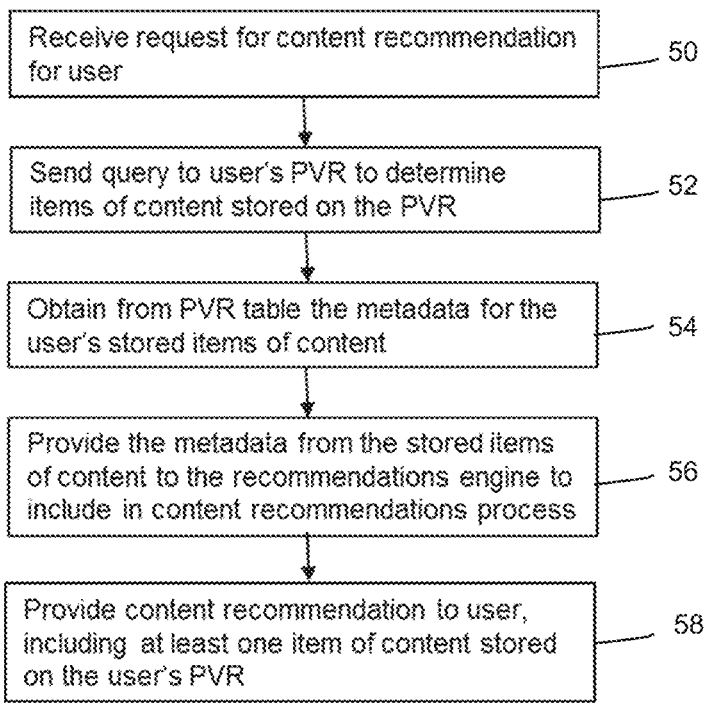
FIG. 4 is a flow chart of a method of recommending content using personal video content information.

FIG. 4 shows a flowchart outlining a mode of operation of the content recommendation system of FIG. 1 to use the data stored in the PVR table 32 to provide content recommendations that may include content items stored at a user's PVR 20a, 20b, . . . 20z.

As a preliminary step, a user has already initiated a viewing session as described earlier with respect to FIG. 1 and the steps of loading user data to the user cache 6 in response to initiating a viewing session may have already been completed.

Then, at stage 50, the content recommendation module 2 receives a request for one or more content recommendations for the user. This step corresponds to the third step described with respect to FIG. 2.

The next step 52 shown in FIG. 4 is sending a query by the content recommendation module 2 to the PVR 20a to determine content items stored on the PVR This step includes receiving identifying information corresponding to the content items stored on the PVR 20a via the PVR communication module 12. Identifying information includes information sufficient to identify the content item. For example, this information may be title and/or episode number of the content item. Alternatively, the identifying information may not include any specific information and may be used to identify the content item in a later step. For example, the identifying information may be a broadcast time and channel of broadcast.

The next step 54 of FIG. 4 comprises obtaining from the PVR table 32 as already described (or other PVR information source in alternative embodiments) for example metadata or other content information corresponding to the content items stored on the user's PVR 20a.

The next stage 56 comprises supplying the content item information relating to the content items stored on the PVR 20a to the CRE 22 to be included in the content recommendation process. The content recommendation process may be performed as described above in relation to FIG. 2.

The next stage 58 comprises providing one or more content item recommendations from the content recommendation process to the user. In this stage of the process, the one or more content item recommendations may include one or more recommendations directed to content items stored on the PVR 20a. The one or more content item recommendations can also include recommendations to content stored on one or more alternative content sources, for example, the EPG or VoD content sources of FIG. 1.

By querying a user's PVR 20a to determine what items of content may be stored by the PVR 20a, in accordance with the process of FIG. 4, accurate information concerning content actually stored at the PVR 20a may be obtained, thus helping to ensure that accurate and useful content recommendations may be provided.

In some alternative embodiments, user data may be stored based on user recording or other actions and may be used to determine what content may be stored at a user's PVR 20a based on an expectation of what content may be present based on previous user actions, rather than querying the PVR 20a directly. However, that may be less accurate than using direct querying of the PVR 20a, for example if the content has subsequently been deleted from the PVR or become corrupted or inaccessible, or for example if the user data has subsequently been deleted (for example because older than 6 months or other specified time period). In such cases, it is possible that the CRE 22 could inadvertently produce recommendations that include content purportedly on the user's PVR 20a but in fact no longer available on the PVR 20a.

Although the system of FIG. 1, and the processes of FIGS. 3 and 4, relate to recommendations based on content stored at users' PVRs 20a, 20b, . . . 20z, in alternative embodiments any other data stores, for instance local storage devices, for example any storage devices included in or associated with user devices, may be used as well as or instead of PVRs. In some embodiments the data stores may comprise data stores forming part of a cloud storage system or other remote and/or networked and/or virtual storage system. Furthermore, the items of content in question are not limited to comprising video content and may comprise any suitable type of content, for example audio content, image content, virtual reality content or augmented reality content.

Figure 6:
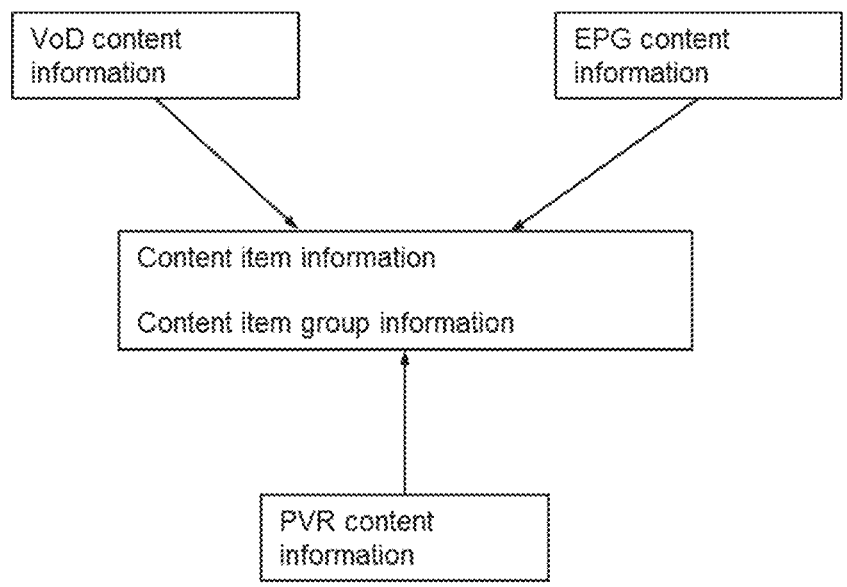
FIG. 6 is a representation of content information modules.

There is description above concerning metadata or other content information that may be used by the CRE 22 in providing content recommendation, FIG. 6 shows content information made available to the content recommendations engine 22 in some embodiments. The content information can contain scheduling information (e.g. start and end times for programmes, series information) together with content information regarding the programme itself (e.g. programme description, age rating information).

Content items, for example programmes, that are scheduled in an electronic programme guide have associated content information (metadata). Information about content available from this source is stored in the EPG content source table. In a similar fashion to EPG content items, information for video on demand (VOD) content items are stored on the VOD module 10. EPG content items and VOD content items sharing certain characteristics can be arranged into groups. In addition to above, content items are stored on PVRs and have associated information. A group of EPG content items may be considered as equivalent to a broadcast television channel. VOD content items can be grouped into logical groups, for example, movie categories. VOD content item groups can be used to enable or restrict access to content items on a per customer basis. PVR content information is collected and stored in the PVR table 32.

For each content item group, either EPG or VOD, the information that is stored may include: an identifier for the group; a name for the group; a flag indicating if the group is free to view and therefore available to all customers; an indicator of video format of the group e.g. unknown, standard definition, high definition and 3D; one or more language labels; primary and secondary geographic area information. Concerning VOD content item groups, the primary and secondary geographic information can be used to allow customers from different countries access to different content. If the group is associated with a channel then an identifier and mapping to the channel may also be stored. One or more content item groups can be associated with a channel number.

Single content items (e.g. programmes) also have associated information and characteristics. Stored content item information can be constant or variable. Constant content item information has values that are the same for all instances of the content item. Variable content item information has values that vary between different instances of the content item. For example, the same episode may be shown at two different times. The two instances of the same episode share constant characteristics, such as duration and rating but different schedule times, for example.

Constant content item information includes: a unique identifier; duration of the content item; the certificate of the content item e.g. the age rating; the year the content item was released; the critic rating for the content item; the original audio language for the content item; the season and episode numbers; series title information and/or identifier; content item description, and a primary language to be used by the recommendations engine 22 when checking for previously recommended items. The primary language may or may not be the same as the original audio language. For multi-language content items, translations of the title and description can be stored. Furthermore, available broadcast language information can be stored and an indicator to indicate the type of language available. For example, the language may be primary audio language, dubbed audio, subtitled and/or signed.

Further information stored for content items includes: genre and sub-genre information and names associated with the content item. A given name can be associated with, for example, an actor or director involved with or appearing in the content item. For a given name associated with the content item, an identifier for the role in the content item is also stored. In addition, an indicator of the rank of importance of the name and/or the role in the content item may be stored. The rank may be high for a more important role in the content item. For example, a given actor playing a leading part would be assigned the highest rank available.

In the embodiment of FIG. 1 recommendations of items of content may be provided based on data concerning items of content of the same type (for example video content, such as movies, TV programmes or other video content), and/or based on user data representing previous consumption of, or actions relating to, content of the same type (for example video content, such as movies, TV programmes or other video content). It will be understood that video content may include associated audio content, for example an associated soundtrack.

In alternative embodiments, recommendations are generated by the CRE 22 for content items of one type based on content information or user actions concerning content of another type. The different types of content may comprise, but are not limited, to video content (for example, movies, TV programmes or other video content), audio content (for example, music, podcasts, talking books), computer games, books, magazines, other printed content, live performances such as concerts, plays, comedy performances or sporting events.

For example, if user data stored for a user, for example in the hard disk 4, indicates that a user has bought tickets or attended a live performance, for example of a musical act or sports team, then the CRE 22 may use that user data in the content recommendation process, which may increases the likelihood that the CRE 22 will recommend a movie or TV programme or other content concerning that musical act or sports team.

Similarly, if user data stored for a user, for example in the hard disk 4, indicates that the user has read or purchased a particular book then the CRE 22 may use that user data in the content recommendation process, which may increases the likelihood that the CRE 22 will recommend a movie or TV adaptation of that book or of other books by the same or similar authors or relating to the same or similar genres (for example, action, crime, romance, etc).

In some embodiments, the content recommendation based on user actions or preferences concerning content of one type may comprises recommendations of more than one type of content. For example, a content recommendation may be based on user actions or preferences in relation to TV programmes, but the content recommendation may comprise recommendations of one or more TV programmes and, in addition, one or more items of another type of content.

Although the system of the embodiment of FIG. 1 includes hard disk storage 4 and RAM 7, any suitable other memory devices or types of storage may be used as well as or instead of the hard disk storage 4 and/or RAM 7 in alternative embodiments.

The above description of specific embodiments is made by way of example only. A skilled person will appreciate that variations of the described embodiments may be made without departing from the scope of the invention.

The invention claimed is:

1. A method of collating content information concerning content stored on a plurality of data stores of a content distribution system, the method comprising:
    receiving a record action message corresponding to a recording of a content item on a data store of the plurality of data stores;
    examining in response to receiving the record action message a collated content information source to determine whether it includes stored content item information corresponding to the content item;
    obtaining, if the collated content information source does not include content item information corresponding to the content item, content information corresponding to the content item from a further content information source; and
    storing the obtained content information in the collated content information source; and
    receiving respective record action messages in respect of each of the plurality of data stores and examining the collated content information source in response to receipt of each record action message, such that the collated content information source collates content information concerning content items stored on the plurality of data stores.

2. The method according to claim 1, wherein the plurality of data stores comprises at least one of:
    a) a plurality of storage devices remote from one another; or
    b) a plurality of storage areas in an at least one of networked storage system virtual storage system or cloud storage system.

3. The method according to claim 1, comprising making the obtained content information in the collated content information source available to a content recommendation processing resource for use in a content recommendation process.

4. The method according to claim 2, wherein the plurality of storage devices and/or the plurality of storage areas comprise a plurality of personal video recorders (PVRs), optionally a plurality of cloud-based PVRs.

5. The method according to claim 1, further comprising storing the obtained content information in the collated content information source in response to the obtained content information not already being stored in the collated content information source and/or in dependence on data representative of a recording date and/or time.

6. The method according to claim 1, wherein each of the plurality of data stores corresponds to a different user.

7. A system of collating content information concerning content stored on a plurality of data stores of a content distribution system, the system comprising a processing resource configured to:
    receive a record action message corresponding to a recording of a content item on a data store of the plurality of data stores;
    examine in response to receiving the record action message a collated content information source to determine whether it includes stored content item information corresponding to the content item;
    obtain, if the collated content information source does not include content item information corresponding to the content item, content information corresponding to the content item from a further content information source;
    store the obtained content information in the collated content information source; and receive respective record action messages in respect of each of the plurality of data stores and examine the collated content information source in response to receipt of each record action message, such that the collated content information source collates content information concerning content items stored on the plurality of data stores.

8. An article of manufacture including one or more non-transitory, tangible computer readable storage mediums having instructions stored thereon that, in response to execution by one or more processors, cause the one or more processors to perform operations comprising:

receiving a record action message corresponding to a recording of a content item on a data store of the plurality of data stores;

examining in response to receiving the record action message a collated content information source to determine whether it includes stored content item information corresponding to the content item;

obtaining, if the collated content information source does not include content item information corresponding to the content item, content information corresponding to the content item from a further content information source;

storing the obtained content information in the collated content information source; and receiving respective record action messages in respect of each of the plurality of data stores and examining the collated content information source in response to receipt of each record action message, such that the collated content information source collates content information concerning content items stored on the plurality of data stores.

\* \* \* \* \*

UNITED STATES PATENT AND TRADEMARK OFFICE
CERTIFICATE OF CORRECTION

| | | |
|---|---|---|
| PATENT NO. | : 12,309,458 B2 | Page 1 of 1 |
| APPLICATION NO. | : 18/481921 | |
| DATED | : May 20, 2025 | |
| INVENTOR(S) | : Peter Docherty et al. | |

It is certified that error appears in the above-identified patent and that said Letters Patent is hereby corrected as shown below:

In the Claims

Claim 1 Column 26, Line 17, delete "source; and" and insert --source;--

Signed and Sealed this
Twenty-fourth Day of June, 2025

Coke Morgan Stewart
*Acting Director of the United States Patent and Trademark Office*